United States Patent

[11] 3,621,474

[72] Inventors Henryk Banasiewicz; Frank McLean Logie, both of London, England

[21] Appl. No. 868,774
[22] Filed Oct. 23, 1969
[45] Patented Nov. 16, 1971

[73] Assignee G. & E. Bradley Limited London, England

[32] Priority Oct. 24, 1968
[33] Great Britain
[31] 50,574/68

[54] BRIDGE TYPE AMPLITUDE MODULATORS
9 Claims, 1 Drawing Fig.

[52] U.S. Cl. 332/47, 307/251, 307/304, 330/72, 330/146, 332/31 T
[51] Int. Cl. H03c 1/54
[50] Field of Search 332/43 B, 47, 31 T; 307/251, 304, 279; 330/72, 146, 175; 331/110

[56] References Cited

UNITED STATES PATENTS

| | | | |
|---|---|---|---|
| 3,010,079 | 11/1961 | Straube | 332/47 |
| 3,432,774 | 3/1969 | Fick | 331/110 X |
| 3,435,375 | 3/1969 | Miller | 332/47 X |
| 3,436,684 | 4/1969 | Mack | 332/47 |
| 3,509,375 | 4/1970 | Gormley | 307/251 |

*Primary Examiner*—Alfred L. Brody
*Attorney*—Woodhams, Blanchard and Flynn

ABSTRACT: An amplitude modulator has a bridge in which each arm consists of a field-effect transistor and one pair of opposite corners of the bridge are connected across the secondary of a transformer through which carrier oscillations are supplied. Modulating signal which may change in polarity is applied to a first differential circuit having its two outputs each of which is connected to the gates of a respective pair of the transistors which are in diametrically opposite arms of the bridge. The other pair of opposite corners of the bridge are connected respectively to two inputs of a second differential amplifier the output terminal of which constitutes the active output terminal of the modulator, an earthed center tap on the secondary of the transformer constituting a reference output terminal for the modulator. Amplitude modulated carrier appears at the output terminals and its phase is inverted when the polarity of the modulating signal changes. The bridge eliminates second harmonic distortion.

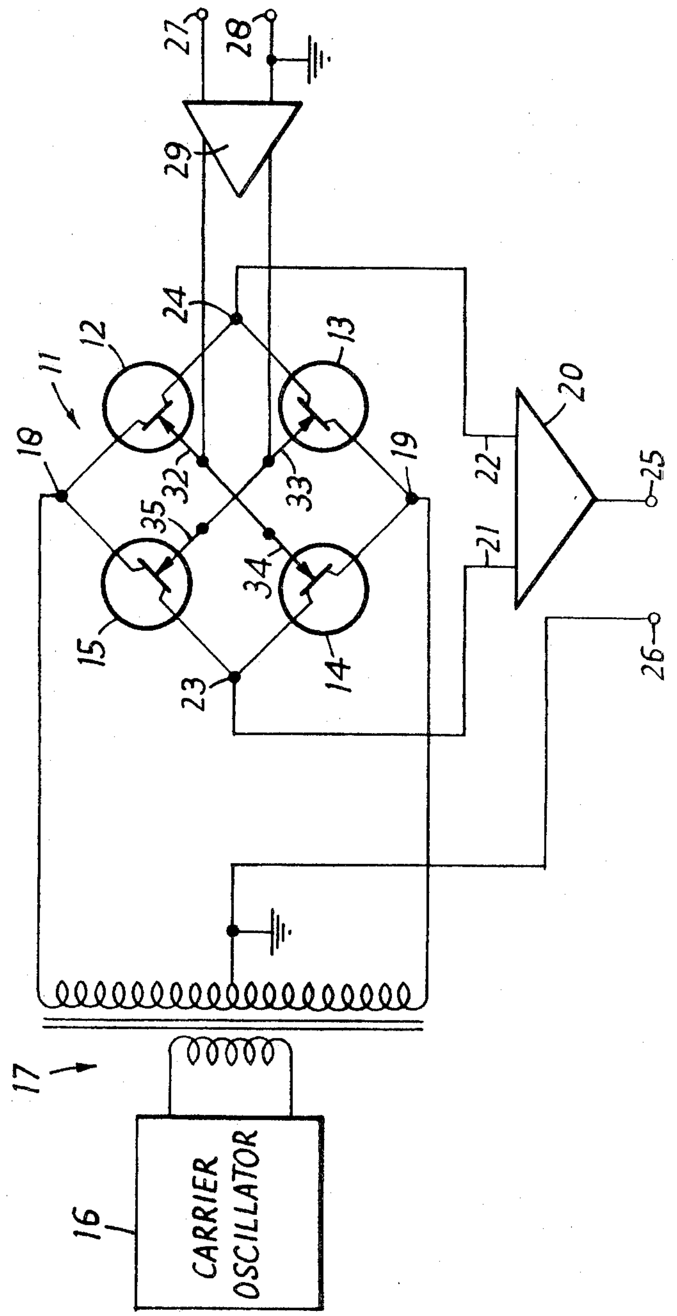
INVENTORS
HENRYK BANASIEWICZ
FRANK McLEAN LOGIE
BY
Woodhams, Blanchard & Flynn
ATTORNEYS

BRIDGE TYPE AMPLITUDE MODULATORS

BACKGROUND OF THE INVENTION

This invention relates to amplitude modulators in which the phase of the amplitude modulated carrier is inverted when the polarity of the modulating signal changes.

A modulator circuit is known in which two field effect transistors are connected in series across the secondary winding a transformer having a center tap which is earthed. Carrier oscillations are applied to the transformer and modulating signal is applied to the gates of the field effect transistor s through an input circuit. The input circuit is such that when the modulating signal is zero equal datum level voltages relative to earth are applied to the gates of the transistors, and when the modulating signal is positive or negative unequal voltages are applied to the gates, these unequal voltages differing by the same amounts for a given modulating signal value from the datum level and the higher of the two voltages being applied to one of the gates when the modulating signal is positive and to the other gate when the modulating signal is negative.

The signal appearing at the common connection between the field effect transistors relative to the center tap of the secondary of the transformer is taken as the output signal. The signal is an amplitude modulated signal at the carrier frequency and its phase is inverted when the polarity of the modulating signal changes.

It has been found that an undesirable component at the second harmonic of the carrier oscillation also appears with the desired amplitude modulated signal.

An object of the present invention is to provide an amplitude modulator in which the phase of the amplitude modulated carrier is inverted when the polarity of the modulating signal changes and in which distortion by the second harmonic of the carrier is eliminated.

SUMMARY OF THE INVENTION

Briefly described, in an amplitude modulator according to the present invention a bridge is formed by four field effect transistors and a differential amplifier has its two inputs coupled across a pair of opposite corners of the bridge. A coupling for carrier oscillations is connected to the other pair of opposite corners of the bridge and includes a reference terminal which constitutes one output terminal of the modulator. In operation the carrier oscillations applied to the two corners of the bridge are in antiphase with one another relative to the reference terminal, and the modulating signal is coupled to the gates of the transistor in such a way that the drain-source resistances of one pair of the transistors which are in diametrically opposed branches of the bridge increase with increase in the modulating signal and the drain-source resistances of the other pair of transistors decrease with increase in the modulating signal only when the modulating signal is of one polarity, and that the drain-source resistances of the said other pair increase with increase in the modulating signal and the drain-source resistances of the said one pair decrease with increase in the modulating signal only when the modulating signal is of the other polarity.

The drain-source resistance of a field effect transistor is used herein to mean the ratio of the drain current to the drain-source voltage in the region of the drain current v. drain-source voltage static characteristics in which the drain current varies substantially linearly with the drain-source voltage for any particular value of the gate-source voltage.

The four field-effect transistors are preferably of the same type, that is, either P-channel or N-channel, and preferably each of the pairs of field effect transistors across which the carrier source is to be coupled constitutes a matched pair.

BRIEF DESCRIPTION OF THE DRAWING

The sole FIG. of the accompanying drawing is a circuit diagram of an amplitude modulator according to the invention in a preferred form coupled to a source of carrier oscillations.

DESCRIPTION OF THE PREFERRED EMBODIMENT

In the drawing there is shown an amplitude modulator in which a bridge 11 is formed by four N-channel field effect transistors 12, 13, 14 and 15, which may be BFS21 transistors. A source of carrier oscillations in the form of a sinusoidal oscillator 16 is coupled by means of an output transformer 17 across one pair of opposite corners 18 and 19 of the bridge 11. A differential amplifier 20, which can be a long-tailed pair, has its two inputs 21 and 22 coupled across the other pair of opposite corners 23 and 24 of the bridge. The output terminal 25 of the differential amplifier 20 constitutes one output terminal of the modulator, and a reference terminal 26 constitutes the other output terminal of the modulator. The reference terminal 26 is connected to a center tap of the secondary winding of the transformer 17 so that the carrier oscillation appearing in operation at the corners 18 and 19 of the bridge are in antiphase with one another relative to the terminal 26.

Input terminals 27 and 28 for the modulating signal are coupled to another differential amplifier 29. The input terminal 28 and the reference terminal 26 are connected to earth. One output of the amplifier 29 is connected to the gates 32 and 34 of field effect transistors 12 and 14 in diametrically opposed branches of the bridge, the other output thereof being connected to the gates 33 and 35 of the other pair of transistors 13 and 15. Those skilled in the art will appreciate that the amplifier 29 can easily be arranged to supply the gates of the transistors with signals at suitable levels. The differential stage of the amplifier 29 can be a long-tailed pair.

Each of the pairs of transistors connected between the corners 18 and 19 of the bridge, that is the pairs 14 and 15, and 12 and 13 constitutes a matched pair. The sources of the transistors 14 and 15 are connected to the corner 23 of the bridge and the sources of the transistors 12 and 13 are connected to the corner 24.

The operation of the modulator will now be explained.

The field effect transistors are operated in a region extending a short way on each side of the origin of their drain current v. drain-source static characteristics, for example, from −0.25 volts to +0.25 volts on the drain-source voltage axis. In this region these characteristics are such that the drain-source resistance remains substantially constant with variation in the drain-source voltage for any particular value of the gate-source voltage. There is, however, a slight nonlinearity on the variation of the drain-current as the drain-source voltage goes through zero for each characteristic. It is arranged that when a modulating signal is at the terminal 27, the transistors 13 and 15 have equal drain-source resistances and the transistors 12 and 14 have equal drain-source resistances. It is also arranged that when the modulating signal at the terminal 27 is negative to earth, the drain-source resistances of the transistors 13 and 15 are greater than those of the transistors 12 and 14, and that when the modulating signal is zero relative to earth, the drain-source resistances of all four transistors 12, 13, 14 and 15 are equal, and that when the modulating signal is positive relative to earth the drain-source resistances of the transistors 12 and 14 are greater than those of the transistors 13 and 15. This is accomplished by a suitable choice of the transistors 12, 13, 14 and 15 and of the signal levels from the outputs of the amplifier 29. Consequently when the modulating signal applied at the terminal 27 is positive or negative relative to earth, and out-of-balance signal at the carrier frequency appears between the corners 23 and 24 of the bridge 11 and is applied to the differential amplifier 2C. When the modulating signal is negative the voltages at the corners 23 and 19 are in phase and the voltages at the corners 24 and 18 are in phase. When the modulating signal is positive the voltages at the corners 23 and 29 are in antiphase and the voltages at the corners 24 and 18 are in antiphase. In other words the input oscillations to the differential amplifier 20 are reversed in phase when the polarity of the modulating signal changes from positive to negative, and vice versa. Thus the output oscillations from the differential amplifier 20 relative to the reference terminal 26 also reverse phase with change in the modulating signal polarity. It will be realized that the amplitude of these output oscillations from the differential amplifier is modulated in proportion to the magnitude of the modulating signal by virtue of the variable drain-source resistances of the field effect transistors 12 to 15.

The bridge configuration of transistors and the differential amplifier 20 eliminate substantially the undesirable appearances at the output terminals 25 and 26 of second harmonic distortion which appears at the corners 23 and 24. This distortion is the consequence of the above-mentioned nonlinearity in the drain-current v. drain-source voltage curve for any given gate-source voltage of all four transistors. For example, if 0 voltage relative to earth is applied to the gates of the transistors 14 and 15 alone, the transistor 15 has a larger drain-source resistance than the transistor 14 during one-half of a carrier oscillation, and vice versa during the second half. Consequently a full wave rectified waveform containing a preponderance of the second harmonic of the carrier oscillation appears at the corner 23 of the bridge. This cannot be obviated by reversing the drain and source connections of one of the transistors, say the transistor 14 so that the drain of the transistor 14 is connected to the source of the transistor 15 and source of the transistor 14 is connected to the corner 19, since to do so would remove the symmetry in the application of the voltages at the gates of these two transistors and would therefore introduce other distortion. However, since the same waveform appears for corresponding reasons at the corner 24 of the bridge when 0 voltage relative to earth is applied to the gates of the transistors 12 and 13, there is no resultant differential input voltage to the differential amplifier 20. Consequently the second harmonic does not appear at the output of the modulator.

We claim:

1. An amplifier modulator including:
   a. four field effect transistors connected to form a bridge circuit, one pair of said transistors being in diametrically opposed branches of said bridge circuit,
   b. coupling means to couple carrier oscillations to one pair of opposite corners of the said bridge circuit,
   c. differential amplifier means having its two inputs coupled across the other pair of opposite corners of the bridge,
   d. an output terminal of the said differential amplifier means comprising one output terminal of the modulator,
   e. a reference terminal of the said coupling means comprising the other output terminal of the modulator such that the carrier oscillations appearing in operation at the said one pair of opposite corners are in antiphase with one another, and
   f. signal input means for applying the modulating signal to the said bridge circuit and means connecting the said signal input means at one side thereof to the gates of said one pair of transistors and at the other side thereof to the gates of the other pair of transistors whereby the drain-source resistances of said one pair of the said transistors which are in diametrically opposed branches of the bridge circuit increase with increase in the modulating signal and the drain-source resistances of said other pair of transistors decrease with increase in the modulating signal only when the modulating signal is of one polarity, and the drain-source resistances of the said other pair increase with increase in the modulating signal and the drain-source resistances of the said one pair decrease with increase in the modulating signal only when the modulating signal is of the other polarity.

2. A modulator as claimed in claim 1, wherein the four transistors are of the same type.

3. A modulator as claimed in claim 2, wherein each of the pairs of transistors across which the said coupling means is connected constitutes a matched pair.

4. A modulator as claimed in claim 3, wherein the said signal input means includes further differential amplifier means coupled to the gates of the said transistors so as to adapt the modulator to supply an AC output signal controllable by a DC modulating signal applied to the input terminals of the said further differential amplifier means in operation.

5. A modulator as claimed in claim 4, wherein the said coupling means is a transformer with a tapping on the secondary winding thereof, said tapping serving as the said reference terminal.

6. A modulator as claimed in claim 1, wherein the said signal input means comprises further differential amplifier means.

7. A modulator as claimed in claim 1, wherein the said coupling means comprises a transformer.

8. An amplitude modulator comprising:
   a. a bridge circuit,
   b. four field effect transistors of the same type constituting two matched pairs of transistors arranged one in each arm of the said bridge circuit,
   c. a carrier input transformer having its secondary winding coupled to one pair of opposite corners of the said bridge circuit,
   d. a first differential amplifier having its inputs coupled across the other pair of opposite corners of the said bridge circuit,
   e. a second differential amplifier for applying a modulating signal to said bridge circuit and having two differential output terminals each of said differential output terminals, being coupled to the gates of a respective pair of the said transistors in diametrically opposed branches of the said bridge circuit,
   f. a center on the secondary winding of the said carrier input transformer serving as one output terminal of the modulator, and
   g. an output terminal of the said first differential amplifier serving as the other output terminal of the modulator.

9. An amplitude modulator as claimed in claim 8, further comprising a source of carrier oscillations coupled to the primary winding of the said carrier input transformer.

* * * * *